United States Patent [19]

Shatford et al.

[11] Patent Number: 4,976,435
[45] Date of Patent: Dec. 11, 1990

[54] VIDEO GAME CONTROL ADAPTER

[76] Inventors: Will Shatford, 8021 Keokuk Ave., Canoga Park, Calif. 91306; Walter T. Shatford, III, 8 Crystal Cove Rd., Laguna Beach, Calif. 92651

[21] Appl. No.: 258,833

[22] Filed: Oct. 17, 1988

[51] Int. Cl.$^5$ .............................................. A63F 9/00
[52] U.S. Cl. ................................. 273/148 B; 273/1 E; 273/DIG. 28; 272/73; 340/709
[58] Field of Search ........... 273/1 E, DIG. 28, 148 B; 272/73, 132; 340/710, 709

[56] References Cited

U.S. PATENT DOCUMENTS

| | | | |
|---|---|---|---|
| 4,278,095 | 7/1981 | Lapeyre | 273/148 B |
| 4,462,594 | 7/1984 | Bromley et al. | |
| 4,489,938 | 12/1984 | Darzinskis | |
| 4,493,992 | 1/1985 | Geller | |
| 4,512,566 | 4/1985 | Bicocchi | 272/73 |
| 4,512,567 | 4/1985 | Phillips | |
| 4,542,897 | 9/1985 | Melton et al. | |
| 4,552,360 | 12/1985 | Bromley et al. | 273/148 B |
| 4,588,187 | 5/1986 | Dell | 273/148 B |
| 4,637,605 | 1/1987 | Ritchie | |
| 4,687,200 | 8/1987 | Shirai | 273/148 B |
| 4,711,447 | 12/1987 | Mansfield | 272/73 |
| 4,824,111 | 4/1989 | Heye et al. | 273/148 B |

FOREIGN PATENT DOCUMENTS 2822343 5/1978 Fed. Rep. of Germany ........ 272/73

Primary Examiner—Edward M. Coven
Assistant Examiner—Jessica J. Harrison

[57] ABSTRACT

Disclosed is an adapter for driving control inputs of a video game system, providing a plurality of selectable functional relationships between a set of input signals and the control inputs, and includes an output section for communicating with the system, a receiver for the input signals, and a microprocessor converter for driving the output section in response to the input signals and for changing a functional relationship between the input signals and the output section according to a configuration selector. The configuration selector defines a first function wherein one of the control inputs is responsive to a particular input signal, and a second function wherein a different one of the control inputs is responsive to the input signal. The first and second functions advantageously provide selective transformations between frames of reference of the input signals and the video game itself whereby video games having differing frames of reference can be operated within the same user frame of reference. Typically, the system receives up, down, left, and right control inputs, the input signals including left and right input signals, the first function defining activation of the left and right control inputs from respective left and right input signals, the second function instead defining activation of the up and down control inputs from the same left and right input signals. Similarly, the configuration selector defines functional relationships for certain of the control inputs in terms of range selectable pedal rate thresholds of an exercise bicycle operated by the user.

21 Claims, 3 Drawing Sheets

VIDEO GAME CONTROL ADAPTER

BACKGROUND

The present invention relates to video games, and more particularly to games wherein an input device such as an exercise bike, or other piece of exercise equipment, is interfaced for providing directional control of a movable game element, as well as for controlling other variable game elements.

In a typical video game, a raster scan display is controlled in response to user input, such as from a joystick or other control input device that is operatively connected to a personal computer or to a video game system. Some personal computers use a conventional TV set. The video game itself is usually defined in a computer program that can be selected from a menu or from a set of program memory modules; the program defining for each video game an input domain whereby particular control inputs are translated into corresponding video game responses.

Popular video games are produced in a variety of configurations, the different positions on an ordinary joystick serving different functions for different games. In some video games, the user has the sensation of moving toward the display (into the screen), his perceived movements relative to a displayed reference being controlled by the joystick to obtain a desired result. For example, in the Mach Rider game by Nintendo, a motorcycle is navigated on a simulated track with the object of destroying enemy agents without being disabled by the agents or other road hazards. LEFT and RIGHT joystick buttons produce corresponding movements of the motorcycle relative to the track. Operation of an A button produces acceleration, while operation of a B button produces simulated machinegun fire. UP and DOWN joystick buttons produce simulated gear shifts. In other video games, the user is perceived as moving in the plane of the display. For example, in Excitebike, another Nintendo game, a bike is navigated on a motorcross track as fast as possible, the bike effectively traveling from left to right on the track. To move the bike toward the left side of the track (toward the top of the screen), the player presses the UP button; to move to the right, the player presses the DOWN button. The A and B buttons control the speed of the bike. The bike can also be made to jump by pressing the LEFT button, and the front wheel can be made to dip following a jump by pressing the RIGHT button. In other video games, there are further variations in input domain configuration as well as the screen frame of reference. Still further variations are to be expected in future video games.

A disadvantage of many video games is that the responses to control inputs often do not correspond to the user's perceived frame of reference. For example, the user often prefers to have the LEFT joystick always result in left movement relative to the game reference, even if the displayed result is transformed, as in Excitebike wherein upward movement on the screen is initiated by the left movement of the joystick. This problem is accentuated when the user switches between games having different screen frames of reference relative to the input domain.

It is also known to obtain user control input to a video game from an exercise device such as an exercise bicycle. See, for example, U.S. Pat. Nos. 4,512,567 to Phillips, 4,542,897 to Melton et al., and 4,637,605 to Ritchie. When an exercise bicycle is used for control input to a video game, the bicycle provides an especially dominant input frame of reference that exacerbates the confusion of the user between the control input and screen frames of reference whenever they are not the same. However, the prior art applications of exercise devices to video games fail to provide a natural correlation between the physical movements for the various control input functions and the game frame of reference, particularly in view of the variety of game frames of reference that exist in popular video game systems. Further, the typical video game applications of exercise devices fail to stimulate the user to perform the work (exercise) by offering an appropriate and natural correlation between the physical work performed and the operation of the video game. For example, users expect to move forward when pedaling an exercise bike, to turn when they apply uneven pressure on the two handgrips, and slow or stop when they cease pedaling. The Ritchie patent fails to meet these expectations: It discloses the use of the pedals of an exercise bike merely to provide a disabling feature to the video game: When the user ceases to pedal at a threshold RPM, the game shuts off. This is contrary to the user's ingrained frame of reference, that would like to see some object on the screen move at a speed correlative to the pedal RPMs. The Ritchie invention is also contrary to the user's expectation that mind and body will work together. This disabling feature merely coerces the user to move forward, like a bullock under the carter's whip.

The control of a game element at a speed proportional to a rotating member is disclosed in U.S. Pat. No. 4,462,594 to Bromley. However, neither Bromley nor Phillips considered that most video games on the market do not accept a proportional voltage input from their control inputs (joysticks) nor do they have an element that moves at a velocity proportional to an input voltage or repetitive pulse that would lend itself to a direct input from an RPM counter or potentiometer. Typical examples of games that do not use a proportional velocity are: Atari's Asteroids, in which firing the thrust motor accelerates the spaceship until it reaches a terminal velocity dictated by the computer program for Asteroids; and Nintendo's Mach Rider, in which the motorcycle travels in one of five discrete speed brackets, depending on gear selection. An examination of the joysticks used by the three major game manufacturers, Atari, Nintendo and Sega, reveals that none provide for proportional voltage signal from the controls: All operate based on discrete on/off electrical signals.

Thus there is a need for a video game control apparatus that provides realistic operation of selected video games with respect to an input frame of reference, the input frame of reference having a desired relation to a screen frame of reference of the selected video game for providing a natural correlation between user inputs and the game, and that is compatible with one or more existing video game systems.

SUMMARY

The present invention meets this need by providing a video game control adapter apparatus for use driving control inputs of a video game, the control adapter apparatus defining a plurality of selected functional relationships between a set of input signals and the control inputs. The apparatus includes output means for communicating with the video game system, input means for receiving the input signals, and converter means for driving the output means in responses to the input means and including a microprocessor and configuration selector means operatively connected to it for changing a functional relationship between the input means and the output means. In one aspect of the invention, the configuration selector means selectively defines a first function wherein one of the control inputs is responsive to a particular input signal, and a second function wherein a different one of the control inputs is responsive to the same input signal. The first and second functions advantageously provide selective transformations between the input frame of reference and the input domain whereby video games having differing frames of reference can be operated within the same user frame of reference. In particular, the control inputs can include up, down, left, and right control inputs and the input signals can include left and right input signals, the first function defining activation of the left and right control inputs from respective left and right input signals, the second function instead defining activation of the up and down control inputs from the same left and right input signals. The configuration selector means can further selectively provide a third function wherein activation of the left control input is responsive to simultaneous activation of the left and right input signals, and a forth function wherein activation of the up control input is responsive to simultaneous activation of the same left and right input signals. The first and second functions can be made independent of the third and fourth functions.

The input signals can include both primary and secondary left and right input signals, and the control inputs can further include first and second control inputs, the configuration selector means further selectively defining a fifth function wherein the right control input is responsive to simultaneous activation of the secondary left and right input signals, and a sixth function wherein the first and second control inputs are responsive respectively to the secondary right and left input signals. The third and forth functions can be made independent of the fifth and sixth functions, and the first and second function can as well be made independent of the other functions of the selector means.

In another aspect of the invention, the configuration selector means can include range means selectively defining for at least one of the input signals a first range wherein one of the control inputs is activated, and a second range wherein another of the control inputs is activated. The selector means can further selectively define a third range of the input signal wherein neither of the control inputs is activated. The input signal can be responsive to movement of a continuously rotatable member with the converter means further including means for determining a variable parameter related to the velocity of the rotatable member, means for selecting from an array a stored first boundary value between the first range and the second range, and means for comparing the variable parameter with the first boundary value. A second boundary value can be selected from another array, the two boundary values defining first, second and third ranges of the variable parameter, the means for comparing determining the first, second and third ranges of the variable parameter. The rotatable member can be the crank of an exercise bicycle, the first boundary value being selectable from at least four values corresponding to between about twenty and about ninety revolutions per minute of the crank, the second boundary value being correspondingly selectable between about thirty and about hundred and twenty revolutions per minute of the crank. Preferably there are at least eight of the selectable values for each of the first and second boundary values. The range means can provide a plurality of functional selections selectable from a group that includes: (a) The third range extending below the first selected boundary, the first range extending between the first and the second boundaries and activating the first control input, and the second range extending above the second boundary and activating the second control input; (b) the third range extending below the first boundary, the second range extending between the first and second boundaries and activating the second control input, and the first range extending above the second boundary and activating the second and up control inputs; (c) the first range extending below the first boundary and activating the first control input, the third range extending between the first and second boundaries, and the second range extending above the second boundary and activating the second control input; and (d) the first range extending below the first boundary and activating the down control input, the third range extending between the first and second boundaries, and the second range extending above the second boundary and activating the up control input. Selection (c) can further define repetitive activation of the first control input at a predetermined rate in the first range of the input signal, and repetitive activation of the second control input at a rate proportional to the rate of rotation of the rotatable member in the second range of the input signal. Thus, defined, the selection (c) is particularly advantageous for play of the game Asteroids that is available from Atari. Similarly, the selection (a) is adapted for play of the game Excitebike by Nintendo; the selection (b) is adapted for play of the game Pole Position by Atari; and the selection (d) is adapted for play of the games 10-Yard Fight, Slalom, and Spy Hunter, by Nintendo.

In another aspect of the invention, the configuration selector means can have a plurality of selector inputs and means selectively driving each of the selector inputs to a voltage that defines its logical state. Preferably the microprocessor is programmed in first program sequence selectively controlling at least two of the control inputs in response to one of the selector inputs in combination with at least one of the input signals, and a second program sequence controlling at least two of the control inputs in response to another of the selector inputs, at least one of the control input states controlled in the second program sequence being capable of overriding a previously determined state of that control input as controlled by the first program sequence. Thus programmed, the adapter apparatus of the present invention advantageously provides independent operation of selected control inputs in the second program sequence, some of which control inputs can be set in the first control sequence unless modified by the second control sequence. For a given complement of functional relationships between the input signals and the control inputs, the present invention can save program memory and more importantly, the functional relationships can be combined to form additional configurations for games that have yet to be published.

In yet another aspect, the present invention includes the output means, an exercise bicycle having handle bars and a pedal crank forming a continuously rotatable member, input means for receiving primary left and right input signals and secondary left and right input signals operatable from respective controls on the handle bars, and a cadence input signal that is responsive to movement of the crank, and the converter means including the microprocessor and configuration selector means and selectively defining the first, second, third, fourth, fifth, and sixth functional relationships between the input means and the output means, and at least one cadence function that activates one of the control inputs when the cadence input signal is within a first range, and activating another of the control inputs when the cadence input signal is within a second range, the cadence function being independent of the other functions. Thus the present invention provides a video game control adapter that advantageously permits a variety of video games having different frames of reference to be played from a single user control input device while maintaining a user frame of reference that is consistent with a variety of video game screen frames of reference.

DRAWINGS

These and other features, aspects, and advantages of the present invention will become better understood with reference to the following description, appended claims, and accompanying drawings where:

DESCRIPTION

Figure 1:
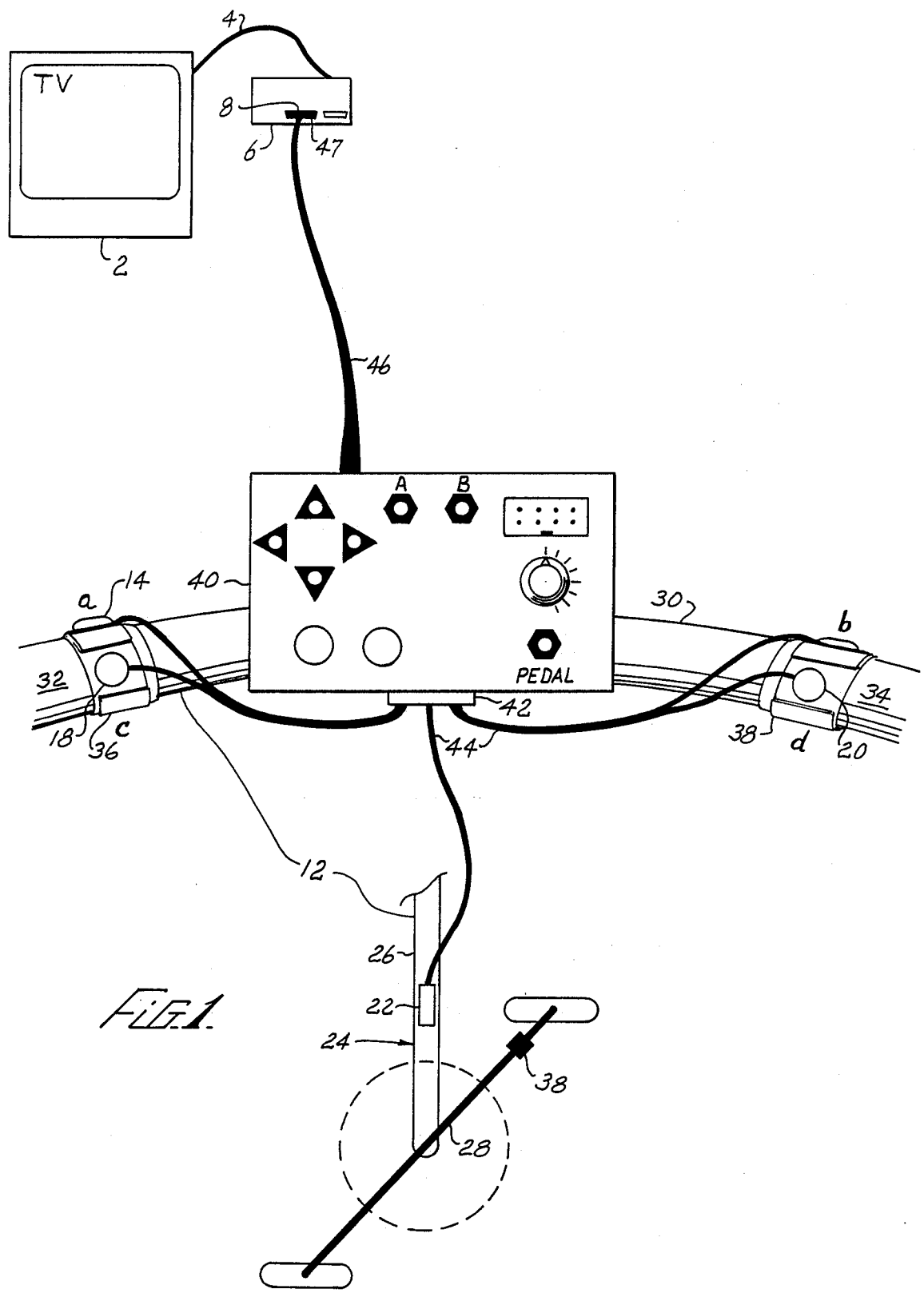
FIG. 1 is a perspective pictorial diagram of a video game system, and a connected game control adapter apparatus for controlling the video game interface from an exercise bicycle according to the present invention.
Figure 2:
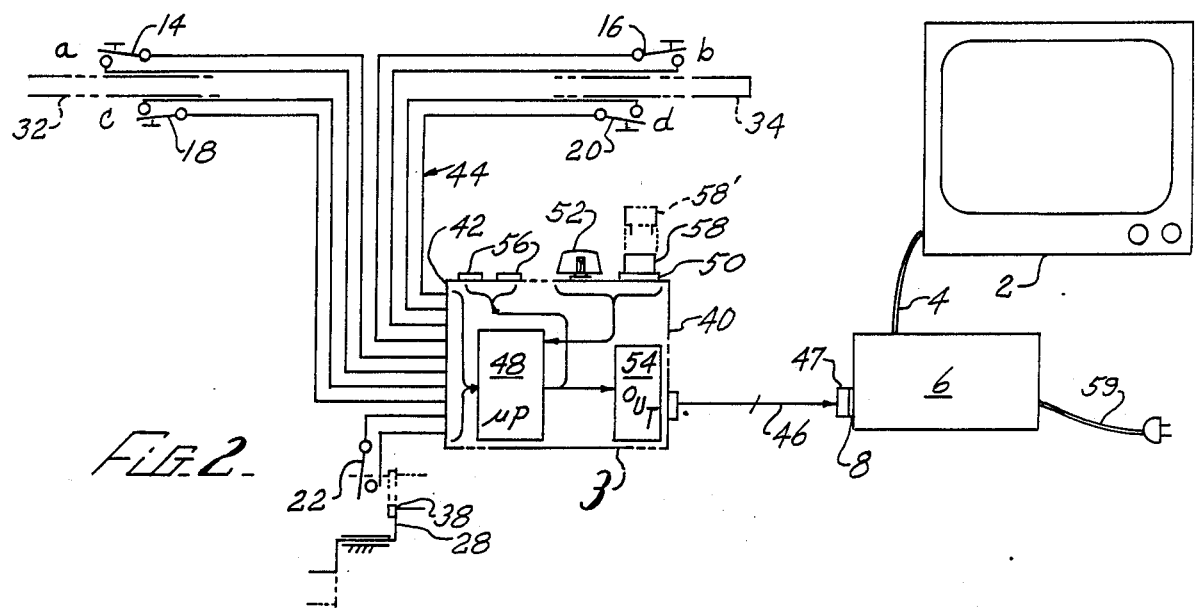
FIG. 2 is a simplified schematic diagram of the apparatus of FIG. 1.

The present invention is directed to a video game control adapter for driving control inputs of a video game from a user-operated control input device, the control inputs having selectable functional relationships relative to the control input device. With reference to the drawings, particularly FIGS. 1 and 2, a video monitor or conventional TV set 2 is connected by a video cable 4 to a video game system 6, the game system 6 having a control input port 8 for receiving control input signals from a user-operated control input device such as a joystick. According to the present invention, a video game control adapter apparatus 10 is connected for driving the control input port 8 in response to a plurality of user controls that are connected to an input device 12, the user controls being designated primary left switch 14, primary right switch 16, secondary left switch 18, secondary right switch 20, and cadence switch 22 in FIG. 1, the user controls producing corresponding user signals a, b, c, d, and p as described below. As further shown in FIG. 1, the input device 12 can form an exercise bicycle 24 having a frame 26, a pedal crank 28 rotatably mounted thereto, and a handlebar 30 mounted to the frame 26, the handlebar 30 forming a handgrip support and having a left grip 32 and a right grip 34 to be grasped by respective hands of the user.

The primary left switch 14 and the secondary left switch 18 are affixed to a left band clamp 36 for attachment to the handlebar 30 proximate the left grip 32. The primary left switch 14 is positioned for actuation by a finger of the user's hand, and the secondary left switch 18 is positioned for convenient operation by the user's left thumb. The primary right switch 16 and the secondary right switch 20 are similarly affixed to a right band clamp 38 for convenient operation by a finger and thumb of the user's right hand. A magnetic armature member 38 is affixed to the pedal crank 28 for repetitively actuating the cadence switch 22 in response to successive revolutions of the crank 28.

The control adapter apparatus 10 also includes an adapter housing 40 that is mounted to the handlebar 30 and having a signal input port 42, the signal input port 42 being connected to the user controls by a signal harness 44. An output cable 46 having an output connector 47 operatively connects the adapter housing 40 to the control input port 8 of the video game system 6.

With further reference to FIG. 2, the adapter housing 40 incorporates a programmed microprocessor 48 that is connected for receiving input signals from the signal input port 42 and program signals from a configuration socket 50 and a range selector 52. The microprocessor 48 is also connected for driving an output interface 54 to the output cable 46, and display indicators 56 for showing activation of the control input signals to the control input port 8 of the video game system 6. Each of the switches 14, 16, 18, 20, and 22 is connected to the signal input port 42 by an associated pair of conductors of the signal harness 44. An important feature of the present invention is a configuration module 58 that is connected to the configuration socket 50 for selectively defining a plurality of functional relationships between the user controls and the control input signals to the control input port 8 as described herein. As shown in FIG. 2, the relationships can be separately defined in a plurality of the modules 58 that are interchangeably connectable to the socket 50, two of the modules being designated 58 and 58' in FIG. 2.

Figure 3:
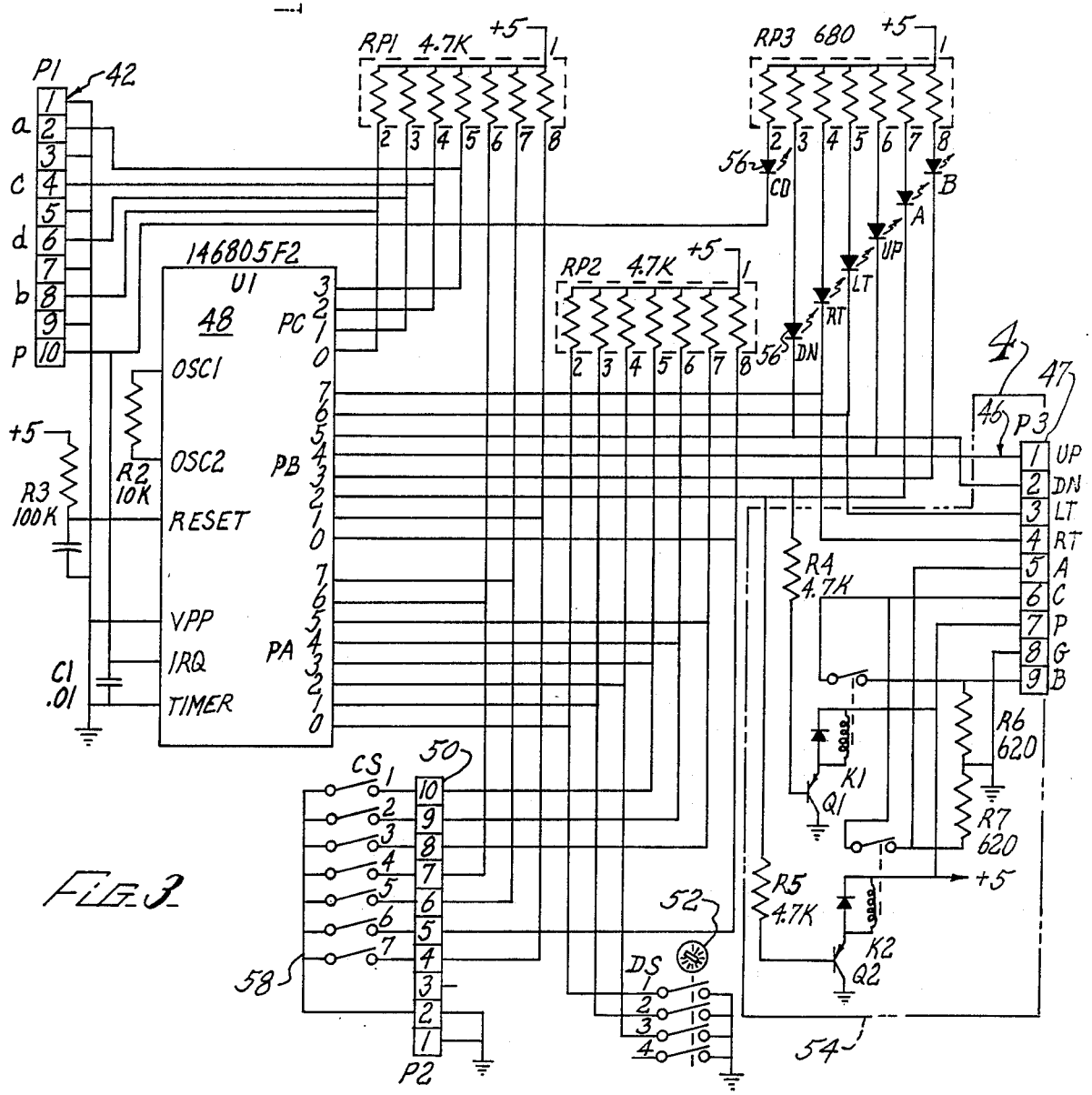
FIG. 3 is a schematic diagram of the apparatus of FIG. 1 within region 3 of FIG. 2.

With further reference to FIG. 3, the signal input port 42 is implemented using a 10-pin connector P1 having individual conductors designated P1-1 through P1-10. The odd conductors (P1-1, 3, 5, 7, and 9) are grounded, the pairs of conductors of the signal harness 44 being connected to adjacent pins of P1 such that the even pins (P1-2, 4, 6, 8, and 10) are selectively grounded in response to activation of the user controls. The even conductors of P1 are also biased to +5 volts through respective elements of a pull-up resistor array RP1, electrical power at +5 volts being provided from the video game system 6 through the output cable 46 as described below. Accordingly, the user signals a, b, c, d, and p, active-low, are produced at P1 by respective activation of the primary left switch 14, the primary right switch 16, the secondary left switch 18, the secondary right switch 20, and the cadence switch 22.

The microprocessor 48 is implemented as a CMOS integrated circuit having multiple bidirectional ports and internal program and data memory segments, and an internal programmable timer. As shown in FIG. 3, the microprocessor 48 is implemented as type 146805F2 which is available as a commercial mask-programmable device from Motorola Semiconductor of Phoenix, Ariz. As implemented in a developmental version of the present invention, a variation of the microprocessor 48, designated 1468705F2 incorporates 64 bytes of on-chip random access memory, 1079 bytes of UV erasable, user programmable read only memory (EPROM), ten bytes of user programmable reset/interrupt vectors, 16 bidirectional I/0 lines (designated PA-0 through PA-7 and PB-0 through PB-7), four input-only lines (designated PC-0 through PC-3), and an external interrupt line (IRQ). The internal timer and the IRQ input each trigger program interrupts.

The user input signals b, d, c, and a are connected, respectively, to the input-onlY lines PC-0 through PC-3 of the microprocessor 48. The user input signal p is loaded to +5 volts through an element of a resistor array RP3, in series with a light-emitting diode forming one of the display indicators 56 and designated CD in FIG. 3, the signal p being also connected to the IRQ input of the microprocessor 48, together with a noise-limiting capacitor C1, for initiating an interrupt sequence of the microprocessor 48 (described below) at the completion of each revolution of the crank 28.

The configuration socket 50 is implemented using a 10-pin connector P2 having individual conductors designated P2-1 through P2-10. The configuration module 58, shown schematically in FIG. 3 as a set of seven individually operable switches CS-1 through CS-7, is removably connected to the configuration socket 50 with one terminal of each CS element being grounded through P2-2. The other terminals of the CS elements are connected, respectively, through other conductors of P2 and biased to +5 volts through elements of the pull-up resistor array RP1, and another such array, designated RP2. The respective elements of CS-1 through CS-7 are also connected to the I/0 lines PA-3 through PA-7, PB-0 and PB-1 of the microprocessor 48, the elements CS-1 through CS-5 being connected, respectively, to the lines PA-3 through PA-07, CS-6 being connected to PB-0, and CS-7 being connected to PB-1. Although the configuration module 58 can be implemented using settable switch elements as described above, a preferred implementation of the present invention includes interchangeable plugable modules 58 for defining alternative functional relations between the input signals and the control outputs to the video game system 6, each of the modules 58 being configured for a particular video game as further described below. For future expansion of the functional configurations, it is also preferred that at least one of the modules 58 be implemented as the switchable elements that are shown in FIG. 3. Moreover, additional modules 58 can be fabricated as desired by adding jumpers to a conventional header plug as described below.

The range selector 52 is implemented as a binary-coded switch, designated DS in FIG. 3 and having elements DS-1 through DS-4 that are selectively grounded according to the angular position of the selector 52. Three of the elements DS-1, DS-2 and DS-3 are biased to +5 volts through elements of the resistor array RP2 and connected, respectively, to the I/0 lines PA-0, PA-1 and PA-2 of the microprocessor 48. As further described below, the I/0 lines PA-0 through PA-7, PB-0, and PB-1 are configured as inputs to the microprocessor 48.

The remaining I/0 lines PB-2 through PB-7 are configured as outputs of the microprocessor 48 for forming respective control inputs to the video game system 6, each being loaded to +5 volts through an element of the resistor array RP3, in series with respective light-emitting diodes forming others of the display indicators 56, the respective indicators 56 being designated A for PB-2, B for PB-3, UP for PB-4, DN for PB-5, LT for PB-6, and RT for PB-7. The outputs PB 2-7 are also connected to the output interface 54 for driving the control input port 8 of the video game system 6 as described herein.

As further shown in FIG. 3, the output interface 54 is configured for driving an Atari game interface, the output connector 47 being provided as a standard female D-9 connector for engaging the control input port 8. In this configuration, the output lines PB-4 through PB-7 are connected, respectively, to the pins P3-1 through P3-4 of the output connector 47, P3-1 providing the UP control input, P3-2 providing the DN control input, P3-3 providing the LT control input, and P3-4 providing the RT control input to the Atari video game system 6. In the Atari video game system, A and B control inputs are obtained by respective contact closures to a C control line from the control input port 8. Accordingly, the output PB-3 is operatively connected through a relay K1 for controlling a contact closure between the control line C at P3-6 and the control input B at P3-9, the relay K1 being driven by a transistor Q1, the base of which is connected through a resistor R4 to the output line PB-3, the control input B being biased to ground through a resistor R6 of the output interface 54. Similarly, the output PB-2 is operatively connected through a relay K2 for controlling another contact closure between the control line C and the control input A at P3-5, the relay K2 being driven by a transistor Q2, from output line PB-2 through a resistor R4, the control input A having its own ground bias resistor R7. The electrical power at +5 volts is typically produced in the video game system 6 by regulator means (not shown), the video game system 6 being powered from a utility cord 59 as shown in FIG. 2. The power at +5 volts is received from the control input port 8 at P3-7, P3-8 serving a ground return path.

Figure 4:
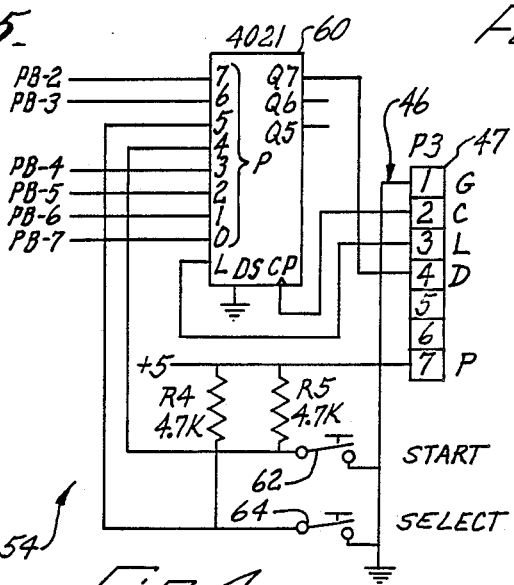
FIG. 4 is a schematic diagram of an alternative configuration of the apparatus of FIG. 1 within region 4 of FIG. 3.

With further reference to FIG. 4, the output interface 54 can have one or more alternative configurations for driving video game hardware having control input configurations other than the Atari configuration shown in FIG. 3. For example, the output interface 54 can be configured for driving a Nintendo game interface as shown in FIG. 4. Instead of receiving the control inputs on separate lines as in the Atari configuration described above, the Nintendo configuration requires the control inputs to be encoded serially on a single line. As shown in FIG. 4, the output interface 54 includes an integrated circuit shift register 60 for performing a parallel to serial conversion of the control inputs, the shift register 60 being implemented as a conventional type 4021 CMOS circuit that is typically used for driving existing Nintendo games. In this configuration, a connector suitable for use as the output connector 47 is available as Part No. 50-3074 from WICO of Niles, Ill. As further shown in FIG. 4, the conductor P3-7 supplies electrical power from the video game system 6 at +5 volts to the control adapter apparatus 10, and conductor P3-1 provides a ground connection. Conductors P3-2 and P3-3 provide respective clock and parallel load signals to the shift register 60, and conductor P3-4 receives the encoded output signal of the last stage Q7 of the shift register 60. The output lines PB-0 through PB-7 of the microprocessor 48 are connected in reverse order to respective parallel inputs of the shift register 60, designated P-0 through P-3, P-6, and P-7. The remaining inputs P-4 and P-5 of the shift register 60 are operatively connected, respectively, to a start switch 62 and a select switch 64 of the output interface 54, in a conventional Nintendo video game system configuration. Operation of the select switch 64 provides selection of a desired game from a plurality of Nintendo game programs, and operation of the start switch 62 begins the selected game. Thus the control input signals, A, B, UP, DN, LT, and RT are serially encoded and sent along the output cable 46 through the conductor P3-4 of the output connector 47, together with the signals from the start switch 62 and the select switch 64, to the control input port 8 of the Nintendo interface.

Figure 5:
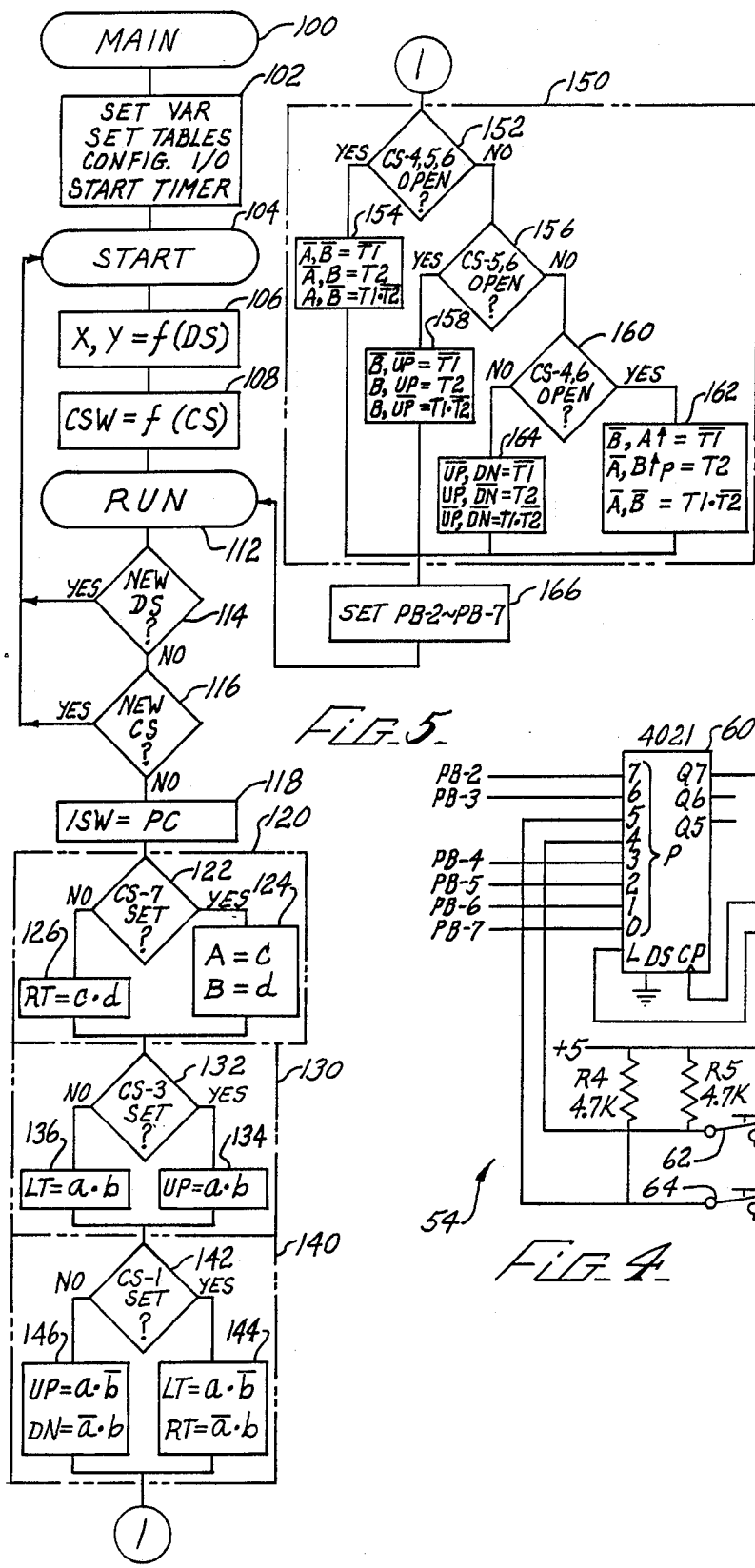
FIG. 5 is a flow diagram of a main computer program for the apparatus of FIG. 1.

With reference to FIG. 5, the microprocessor 48 is programmed according to the present invention to perform a sequence of steps for driving the control inputs to the video game system 6 in response to the user inputs, the range selector, and as defined by the configuration module 58 as described herein. The microprocessor 48 is representative of similar computer systems that may be used to practice the present invention, having program steps and data that are processed in eight-bit bytes, with directly addressable program and data memory. The ports PA, PB, and PC of the microprocessor 48 are also addressable as memory mapped registers.

As shown in FIG. 5, the program includes a MAIN sequence 100 which is initiated by the application of the +5 volt power, beginning with a set-up step 102 in which data variables and tables are stored with initial values, the ports PA and PB are configured with PA, PB-0, and PB-1 as inputs; and PB-2 through PB-7 are configured as outputs and loaded with initial values. Next, at a START location 104, a set DXY step 106 is performed in which PA is read, bits 0-2 being designated DS and used as an offset for obtaining and storing variable X and Y cadence thresholds from preprogrammed tables of such values. As shown below in Table 1, the stored table values are the number of timer counts at one count per second that correspond to a cadence RPM of the pedal crank 28. The range selector 52 and the offset DS that is read therefrom thus functions as a difficulty setting, selecting three ranges of pedal RPMs from eight preprogrammed sets of such ranges, one range including pedal rates below the Y threshold, another range including rates above the X threshold, and a further range including rates that lie between the X and Y thresholds, further described below.

TABLE 1

| DS | Cadence Difficulty Thresholds | | | |
|---|---|---|---|---|
| | X | (RPM) | Y | (RPM) |
| 0 | 180 | 20 | 120 | 30 |
| 1 | 120 | 30 | 90 | 40 |
| 2 | 90 | 40 | 72 | 50 |
| 3 | 72 | 50 | 54 | 65 |
| 4 | 60 | 60 | 44 | 80 |
| 5 | 50 | 70 | 36 | 95 |
| 6 | 44 | 80 | 32 | 110 |
| 7 | 40 | 90 | 28 | 125 |

Following the set DXY step 106, a set CSW step 108 reads PA and PB, combining PB bits 0 and 1 and PA bits 3-7 into a single byte that is stored as CSW, reflecting a configuration switch setting of the configuration module 58. Then, in a set clock step 108, timer counter, cadence, and flag variables are first cleared, then the timer data and control registers are loaded for setup and start of the timer itself whereby timer interrupts are produced at predetermined intervals. Next, at a RUN location 112, a compare DS step 114 tests whether DS fails to correspond to a fresh reading of PA bits 0-2, in which case control is transferred to the START location 104 in response to a new setting of the range selector 52; otherwise, a compare CSW step 116 similarly tests for a new setting of the configuration module 58. If neither DS nor CSW has changed, a set ISW step 118 reads PC and stores as ISW the states of the input signals a, b, c, and d from the user controls. In the remainder of the RUN program sequence, each of the outputs PB-2 through PB-7 is set, active low, in response to the stored values X, Y, CSW and ISW, as modified by activity on the IRQ line that results from pedaling of the pedal crank 28. In the following description, the outputs of the microprocessor 48 are designated by the corresponding control inputs to the video game system 6, namely A, B, UP, DN, LT, and RT.

Following the set ISW step 118, the RUN sequence first performs a low priority sequence 120 for conditionally controlling A and B, or RT, active high, as bits of a variable MOUT in response to the user inputs c and d. As further described below, the outputs PB-2 through PB-7 are set as bitwise complements of MOUT at the end of the RUN sequence, but are not affected by changes in MOUT until then. In the sequence 120, a CSW7 step 122 tests whether CS-7 was closed, in which case an AB7 step 124 sets A and B of MOUT in direct correspondence with the inputs c and d; otherwise, an RT7 step sets RT of MOUT true when the inputs c and d were both active (true), but sets RT false if either c or d were false. Thus the secondary left switch 18 and the secondary right switch 20 are configured to activate the control inputs A and B, respectively, when CS-7 of the configuration module 58 is closed; but the switches 18 and 20 are instead configured to activate the control input RT when both are operated simultaneously, and to deactivate RT when either of the switches 18 or 20 is open. Accordingly, the secondary switches 18 and 20 function as the A and B joystick buttons when CS-7 is closed, such as for play of the Nintendo games 10-Yard Fight and Spy Hunter; but when CS-7 is open, the switches 18 and 20, operated together, function for producing a realistic front wheel dip response in play of the Nintendo game Excitebike by activating the RT control input, the realistic response resulting from forward thumb pressure being required for operation of the secondary switches 18 and 20.

Following the low priority sequence 120, the RUN sequence next performs a middle priority sequence 130 for conditionally controlling UP, or LT, of MOUT in response to the user inputs a and b. In the sequence 130, a CSW3 step 132 tests whether CS-3 was closed, in which case an UP3 step 134 sets UP of MOUT true when the inputs a and b were both active (true), but sets UP false if either a or b were false; otherwise, an LT3 step 136 sets LT of MOUT true when the inputs a and b were both active, but sets LT false if either a or b were false. Thus the primary left switch 14 and the primary right switch 16 are configured to activate the UP control input only when both are operated simultaneously, for realistic forward motion control (while pedaling at a proper cadence as described below) when CS-3 is closed, such as for play of the Atari game Asteroids. When CS-3 is open, however, the switches 14 and 16, operated together, function for producing a realistic jump response in play of the Nintendo game Excitebike by activating the LT control input, the realistic response resulting from backward finger pressure being required for operation of the primary switches 14 and 16.

Following the sequence 130, a high priority sequence 140 conditionally controls LT and RT, or UP and DN of MOUT in response to the user inputs a and b. In the sequence 140, a CSW1 step 142 tests whether CS-1 was closed, in which case an LTRT1 step 144 sets LT and RT of MOUT according to respective activation of the inputs a or b; otherwise, an UPDN1 step 146 sets UP and DN of MOUT in corresponding relation to activation of the inputs a or b. Thus when CS-1 is open, the primary switches 14 and 16 function for producing realistic lateral directional control in play of the Nintendo game Excitebike by activating the UP and DN control inputs, the realistic response resulting from movement of an image 70 of the user in left and right directions relative to a displayed track path 72 in response to corresponding left and right finger pressure, as shown in FIG. 2. The user can be oblivious to the requirement for activation of the UP and DN control inputs for obtaining the left and right movement relative to the track where, as in Excitebike, the forward direction of the user is displayed as horizontal movement across the display field. For games wherein the rider is perceived as moving toward the screen, CS-7 is closed such that left and right directional control is obtained by activation of the LT and RT control inputs in realistic response to operation of the primary left switch 14 or right switch 16.

Following the sequence 140, the run sequence next performs a top priority sequence 150 for conditionally controlling A and B, or B and UP, or UP and DN of MOUT in response to the user's pedal cadence as sensed by the input p. In the sequence 150, a CSW456 step 152 tests whether CS-4, CS-5, and CS-6 were each open, in which case an AB456 step 154 controls A and B of MOUT as described herein, depending on the states of a pair of cadence flags T1 and T2 that are set in the interrupt sequence (described below). The flag T1 is true when a variable CAD (an averaged number of timer counts per revolution of the pedal crank 28) is less than or equal to X. Similarly, the flag T2 is also set if CAD is less than or equal to Y. In the AB456 step 154, A and B of MOUT are set false when T1 is false, for disabling the control outputs A and B when the pedal cadence is less than the first threshold X. A of MOUT is set false and B of MOUT is set true when the flag T2 is true for activating the control input B, but not A, when the pedal cadence is faster than the second threshold Y. When T1 is true and T2 is false, A is set true and B is set false in MOUT for activating the A control input, but not B, when the pedal cadence is between the thresholds X and Y. Thus when CS-4, CS-5, and CS-6 are each open, the cadence switch 22 functions for realistic operation of the Nintendo game Excitebike, producing forward game movement when the user pedals the exercise bicycle 24 at a normal speed (between the X and Y thresholds), the apparatus 10 activating the A control input, but not B. For more rapid forward movement, the user must pedal faster activating the B control input, but not A. If the pedal cadence is slower than the X threshold, forward progress slows to a stop as a result of neither the A nor B control inputs being activated.

If CS-4, CS-5, and CS-6 were not each open as determined in the CSW456 step 152, a CSW56 step 156 tests whether CS-5 and CS-6 were each open, in which case B and UP of MOUT are both set false when T1 is false, both B and UP are set true when T2 is true, and B is set true while UP is set false when only T1 is true, in a BUP56 step 158. Thus when CS-5 and CS-6 are both open and CS-4 is closed, the B and UP control inputs are activated in response to the pedal cadence for realistic operation of the Atari game Pole Position wherein acceleration and deceleration of a depicted race car that effectively travels into the screen is controlled by the user's pedal cadence, acceleration to normal speed by activating the B control input, acceleration is obtained simultaneous activation of the B and Up control inputs, and deceleration results from activation of neither the B nor the UP control inputs.

If CS-5 and CS-6 were not both open as determined in the CSW56 step 156, a CSW46 step 160 tests whether CS-4 and CS-6 are both open, in which case an AB46 step 162 controls A and B of MOUT as follows for realistic control of an "invisible" attribute and gun firing in operation of the Atari game Asteroids:

1. If T1 is false, in MOUT set B false and activate A once per second for approximately 0.1 second;
2. If T2 is true, in MOUT set A false and activate B periodically at a repetition rate proportional to the pedal rate as sensed by the cadence switch 22; and
3. If only T1 is true, in MOUT set both A and B false, and reset temporary flags and counters employed in the repetitive activation of A or B.

As described above, the AB46 step 162 provides repetitive activation of the A control input for making a space ship in the game Asteroids temporarily invisible when the user pedals slowly (below the X threshold). When the user pedals rapidly (above the Y threshold), there is repetitive activation of the B control input for firing a ship's gun at a rate proportional to the pedal rate. When the user pedals at a normal rate (between the X and Y thresholds), the A and B control inputs are disabled.

If CS-4 and CS-6 were not both open as determined in the CSW46 step 160, UP is set false and DN is set true in MOUT when T1 is false, UP is set true and DN is set false when T2 is true, and both UP and DN are set false when only T1 is true, in an UPDN46 step 164. Thus when CS-4 and CS-5 are closed and CS-6 is open, the UPDN46 step 164 activates the UP and DN control inputs for realistically controlling the speed of a displayed skier or car in the Nintendo games Slalom and Spy Hunter in response to the user's pedal rate; and for similarly controlling forward and reverse movement of a selected defensive player in the Nintendo game 10-Yard Fight. Also, by pedaling slowly and activating the secondary right switch 20, the user produces a kick of a game ball by simultaneous activation of the A and DN control inputs in 10-Yard Fight.

Following the top priority sequence 150, an output step 166 causes PB-2 through PB-7 to be set as the bitwise complement of MOUT, simultaneously driving the control inputs A, B, UP, DN, LT, and RT as previously defined in the sequences 120, 130, 140, and 150, described above, after which control is transferred to the beginning of the RUN sequence 112, the RUN sequence being repeated until a change occurs in either the range selector 52 (See the compare DS step 114, described above) or the configuration module 58 (See the compare CSW step 116, also described above.).

Figure 6:
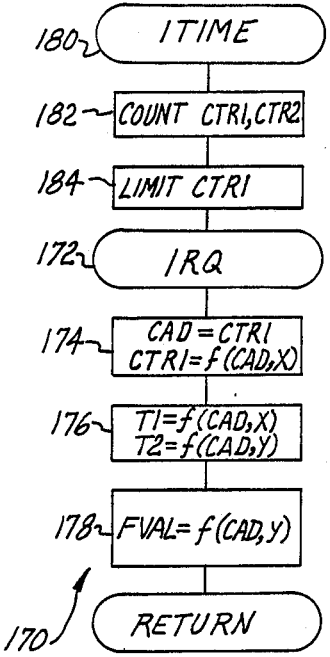
FIG. 6 is a flow diagram of an interrupt program sequence for the main computer program of FIG. 5.

With further reference to FIG. 6, the microprocessor 48 is also programmed with an interrupt sequence 170 to which control is temporarily transferred from the MAIN sequence 100 when the IRQ line is activated by closure of the cadence switch 22, and when timeout of the internal timer occurs. When the IRQ line is activated, control is transferred to an IRQ location 172 at which a cadence step 174 updates the variable CAD from the contents of an averaging counter register CTR1, then either clears CTR1 if an overflow had occurred, or resets CTR1 to X. Next a Tflag step 176 updates T1 and T2 according to a comparison of CAD with the cadence thresholds X and Y, T2 being set true if CAD is less than Y, for indicating that the pedal rate is faster than the Y threshold; T1 and T2 being set false if CAD is greater than X, for indicating that the pedal rate is slower than the X threshold; and T1 being set true, T2 being set false if CAD is between the X and Y thresholds. Following the Tflag step 176, a fire step 178 computes a variable FVAL as a function of the difference between CAD and the Y threshold. In particular, FVAL is set such that as CAD decreases below Y in multiples of two timer counts per revolution, from 2 to 32 repetitions of the B control output are produced for each revolution of the pedal crank 28 in the AB46 step 162 of the MAIN sequence 100, described above. Following the fire step 178, control is returned from the interrupt sequence 170 to the MAIN sequence 100 at the point at which the interrupt occurred.

As also shown in FIG. 6, control is temporarily transferred from the MAIN sequence 100 to the interrupt sequence 170 at an ITIME location 180 in response to timeout of the internal timer of the microprocessor 48, at which point a count step 182 increments CTR1 and a second count register CTR2 that provides a time base for the AB46 step 162 of the MAIN sequence 100, described above. Then a clamp step 184 limits CTR1 in the case of an overflow condition, in which case the flags T1 and T2 are also cleared for indicating a very slow pedal rate in the MAIN sequence 100.

Following the clamp step 184, program control is transferred to the IRQ location 172, after which control is again transferred to the MAIN sequence 100 at the conclusion of the interrupt sequence 170.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A video game control adapter apparatus for driving a video game system, the video game system having a plurality of control inputs defining an input domain, the apparatus comprising:
   (a) output means for communicating with the video game system;
   (b) input means for receiving a plurality of input signals, the input signals defining a user domain; and
   (c) converter means for driving the output means in response to the input means, the converter means comprising:
      (i) microprocessor means operatively responsive to the input means for controlling the output means; and
      (ii) configuration selector means operatively connected to the microprocessor means for selectively changing a functional relationship between the user domain and the input domain.

2. The apparatus of claim 1 wherein the configuration selector means comprises means selectively defining a first function wherein one of the control inputs is responsive to a particular input signal, and a second function wherein a different one of the control inputs is responsive to the same particular input signal.

3. The apparatus of claim 2 wherein the control inputs include up, down, left, and right control inputs and the input signals include left and right input signals, the first function of the configuration selector means defining activation of the left and right control inputs respectively from the left and right input signals, the second function defining activation of the up and down control inputs respectively from the left and right input signals.

4. The apparatus of claim 3 wherein the configuration selector means further comprises means selectively defining a third function wherein activation of the left control input is responsive to simultaneous activation of the left and right input signals, and a fourth function wherein activation of the up control input is responsive to simultaneous activation of the left and right input signals.

5. The apparatus of claim 4 wherein the first and second functions of the configuration selector means are independent of the third and fourth functions.

6. The apparatus of claim 4 wherein the left and right input signals are primary left and right input signals, the input signals further include secondary left and right input signals, and the control inputs further include first and second control inputs, the configuration selector means further comprising means selectively defining a fifth function wherein the right control input is responsive to simultaneous activation of the secondary left and right input signals, and a sixth function wherein the first control input is responsive to the secondary right input signal and the second control input is responsive to the secondary left input signal.

7. The apparatus of claim 6 wherein the third and fourth functions are independent of the fifth and sixth functions, and the first and second functions are independent of the third, fourth, fifth, and sixth functions of the configuration selector means.

8. The apparatus of claim 3 wherein the left and right input signals are primary left and right input signals and the input signals further include secondary left and right input signals, and the control inputs further include first and second control inputs, the configuration selector means further comprising means selectively defining a fifth function wherein the right control input is responsive to simultaneous activation of the secondary left and right input signals, a sixth function wherein the first control input is responsive to the secondary right input signal and the second control input is responsive to the secondary left input signal.

9. The apparatus of claim 8 wherein the first and second functions of the configuration selector means are independent of the fifth and sixth functions.

10. The apparatus of claim 1 wherein the configuration selector means comprises range means selectively defining for at least one of the input signals a first range of the input signal wherein one of the control inputs is activated, and a second range wherein another of the control inputs is activated.

11. The apparatus of claim 10 wherein the configuration selector means further comprises means selectively defining a third range of the input signal wherein neither of the control inputs is activated.

12. The apparatus of claim 10 wherein the input signal is responsive to movement of a continuously rotatable member, the converter means further comprising:

(a) means for determining a variable parameter corresponding to a rate of rotation of the rotatable member;
(b) means for selecting a stored first boundary value from a first set of boundary values, the selected boundary value defining a boundary between the first range and the second range; and
(c) means for comparing the variable parameter with the selected first boundary value.

13. The apparatus of claim 12 wherein the converter means further comprises means for selecting a stored second boundary value from a second set of boundary values, the first and second boundary values defining first, second and third ranges of the variable parameter, and the means for comparing is responsive to the first and second boundary values for determining the first, second and third ranges of the variable parameter.

14. The apparatus of claim 13 wherein the rotatable member is an exercise bicycle crank and the first set of boundary values comprises at least four values corresponding to between approximately 20 and approximately 90 revolutions per minute of the crank and the second set of boundary values comprises at least four values corresponding to between approximately 30 and approximately 125 revolutions per minute of the crank.

15. The apparatus of claim 14 wherein there are at least eight of each of the first and second sets of boundary values.

16. The apparatus of claim 13 wherein the control inputs include up, down, first and second control inputs and the range means provides a plurality of functional selections selected from the group of selections comprising:
(a) a first selection wherein the third range extends below the first selected boundary, the first range extends between the first and the second selected boundary and activating the first control input, and the second range extends above the second selected boundary and activating the second control input;
(b) a second selection wherein the third range extends below the first selected boundary, the second range extends between the first and the second selected boundary and activating the second control input, and the first range extends above the second selected boundary and activating the second and up control inputs;
(c) a third selection wherein the first range extends below the first selected boundary and activating the first control input, the third range extends between the first and the second selected boundary, and the second range extends above the second selected boundary and activating the second control input; and
(d) a fourth selection wherein the first range extends below the first selected boundary and activating the down control input, the third range extends between the first and the second selected boundary, and the second range extends above the second selected boundary and activating the up control input.

17. The apparatus of claim 16 wherein the third selection defines repetitive activation of the first control input at a predetermined rate in the first range of the input signal, and repetitive activation of the second control input at a rate proportional to the rate of rotation of the rotatable member in the second range of the input signal.

18. The apparatus of claim 1 wherein the configuration selector means comprises a plurality of selector inputs and means selectively driving each of the selector inputs to one of two electrical voltages for defining corresponding logical states of the selector inputs.

19. The apparatus of claim 18 wherein the microprocessor means comprises a microprocessor programmed in a first program sequence wherein at least two of the control inputs are selectively controlled in response to one of the selector inputs in combination with at least one of the input signals, and a second programmed sequence wherein a least two of the control inputs are selectively controlled in response to another of the selector inputs, at least one of the control input states controlled in the second program sequence being capable of overriding a previously determined state of that control input as controlled by the first programmed sequence, the second program sequence thereby providing control of its control inputs independently of the first program sequence.

20. A video game control adapter apparatus for driving a video game system, the video game system having a plurality of control inputs defining an input domain and including first, second, up, down, left, and right control inputs, the apparatus comprising:
(a) output means for communicating with the video game system;
(b) an exercise bicycle having a hand-grip support and a pedal crank forming a continuously rotatable member;
(c) input means for receiving a plurality of input signals, the input signals defining a user domain and including primary left and right input signals and secondary left and right input signals operable from respective controls on the hand-grip support, and a cadence input signal, the cadence input signal being responsive to movement of the crank; and
(d) converter means for driving the output means in response to the input means, the converter means comprising:
(i) microprocessor means operatively responsive to the input means for controlling the output means; and
(ii) configuration selector means operatively connected to the microprocessor means for selectively changing a functional relationship between the user domain and the input domain, comprising means selectively defining a first function wherein the left and right control inputs are responsive respectively from the left and right input signals, a second function wherein the up and down control inputs are responsive respectively to the left and right input signals, a third function wherein the left control input is responsive to simultaneous activation of the primary left and right input signals, a fourth function wherein the up control input is responsive to simultaneous activation of the primary left and right input signals, a fifth function wherein the control input is responsive to simultaneous activation of the secondary left and right input signals, and a sixth function wherein the first control input is responsive to the secondary right input signal and the second control input is responsive to the secondary left input signal, and at least one cadence function wherein one of the control inputs is activated when the cadence input signal is within a first range, and another of the control inputs is activated when the cadence input signal is within a second range, the cadence function being independent of the other functions, the first and second functions being independent of the third, fourth, fifth, and sixth functions, and the third and fourth functions being independent of the fifth and sixth functions.

21. A video game control adapter apparatus for driving a video game system, the video game system having a plurality of control inputs, including up, down, left, and right control inputs, defining an input domain, the apparatus comprising:

(a) output means for communicating with the video game system;

(b) input means for receiving a plurality of input signals, including left and right input signals, the input signals defining a user domain; and (c) converter means for driving the output means in response to the input means, the converter means comprising configuration selector means operatively connected to the microprocessor for changing a functional relationship between the user domain and the input domain, comprising means selectively defining a first function wherein one of the control inputs is responsive to a particular input signal defining activation of the left and right control inputs respectively from the left and right input signals, and a second function wherein a different one of the control inputs is responsive to the same particular input signal defining activation of the up and down control inputs respectively from the left and right input signals.

* * * * *